(12) United States Patent
Pearson

(10) Patent No.: US 11,713,209 B2
(45) Date of Patent: Aug. 1, 2023

(54) GLOW FISH TAPE SYSTEM

(71) Applicant: Klein Tools, Inc., Lincolnshire, IL (US)

(72) Inventor: Daniel R. Pearson, Fortworth, TX (US)

(73) Assignee: Klein Tools, Inc., Lincolnshire, IL (US)

( * ) Notice: Subject to any disclaimer, the term of this patent is extended or adjusted under 35 U.S.C. 154(b) by 672 days.

(21) Appl. No.: 16/696,383

(22) Filed: Nov. 26, 2019

(65) Prior Publication Data

US 2021/0155445 A1    May 27, 2021

(51) Int. Cl.
*B65H 75/40*    (2006.01)
*H02G 11/02*    (2006.01)

(52) U.S. Cl.
CPC .......... *B65H 75/406* (2013.01); *H02G 11/02* (2013.01); *B65H 2701/376* (2013.01)

(58) Field of Classification Search
CPC ........ B65H 75/00; B65H 75/02; B65H 75/34; B65H 75/36; B65H 75/362; B65H 75/364; B65H 75/38; B65H 75/40; B65H 75/406; B65H 2701/00; B65H 2701/30; B65H 2701/37; B65H 2701/376; H02G 11/00; H02G 11/006; H02G 11/02; H02G 11/06; H02G 11/08; H02G 11/083; H02G 11/085
USPC .................................. 254/134.3 R, 134.3 FT
See application file for complete search history.

(56) References Cited

U.S. PATENT DOCUMENTS

| | | | |
|---|---|---|---|
| 3,601,330 A * | 8/1971 | Minobe .................. | H02G 11/02 242/405.1 |
| 6,293,519 B1 | 9/2001 | Farretta | |
| 6,433,703 B1 * | 8/2002 | Tucker ............... | A01K 89/0102 340/815.5 |
| 2004/0206529 A1 | 10/2004 | Sawyer et al. | |
| 2005/0062028 A1 * | 3/2005 | Konen .................... | H02G 11/02 254/134.3 FT |
| 2006/0065883 A1 * | 3/2006 | Radle ..................... | H02G 11/02 254/134.3 FT |
| 2009/0257221 A1 * | 10/2009 | Patterson ............... | H02G 1/081 362/362 |
| 2015/0330771 A1 * | 11/2015 | Moffatt ................ | G01B 11/022 356/634 |
| 2017/0213431 A1 | 7/2017 | Huo | |
| 2019/0292005 A1 * | 9/2019 | Miller ................ | B65H 75/4428 |

FOREIGN PATENT DOCUMENTS

| | | |
|---|---|---|
| EP | 1914508 A2 | 4/2008 |
| JP | 2001-174202 A | 6/2001 |

OTHER PUBLICATIONS

United Kingdom Intellectual Property Office, Search Report in United Kingdom Patent Application No. GB2018458.6, 4 pp. (dated Apr. 23, 2021).

* cited by examiner

*Primary Examiner* — Hoai-An D. Nguyen

(57) ABSTRACT

A fish tape system includes a fish tape and a case having a storage compartment that stores the fish tape for deployment from the case. The fish tape has a length extending from a first end to a second end. The length includes a luminescent material that emits light after being energized by exposure to a light source. At least a portion of the case is transparent to allow the luminescent material 22 to be energized by light passing through the transparent portion and into the storage compartment.

18 Claims, 4 Drawing Sheets

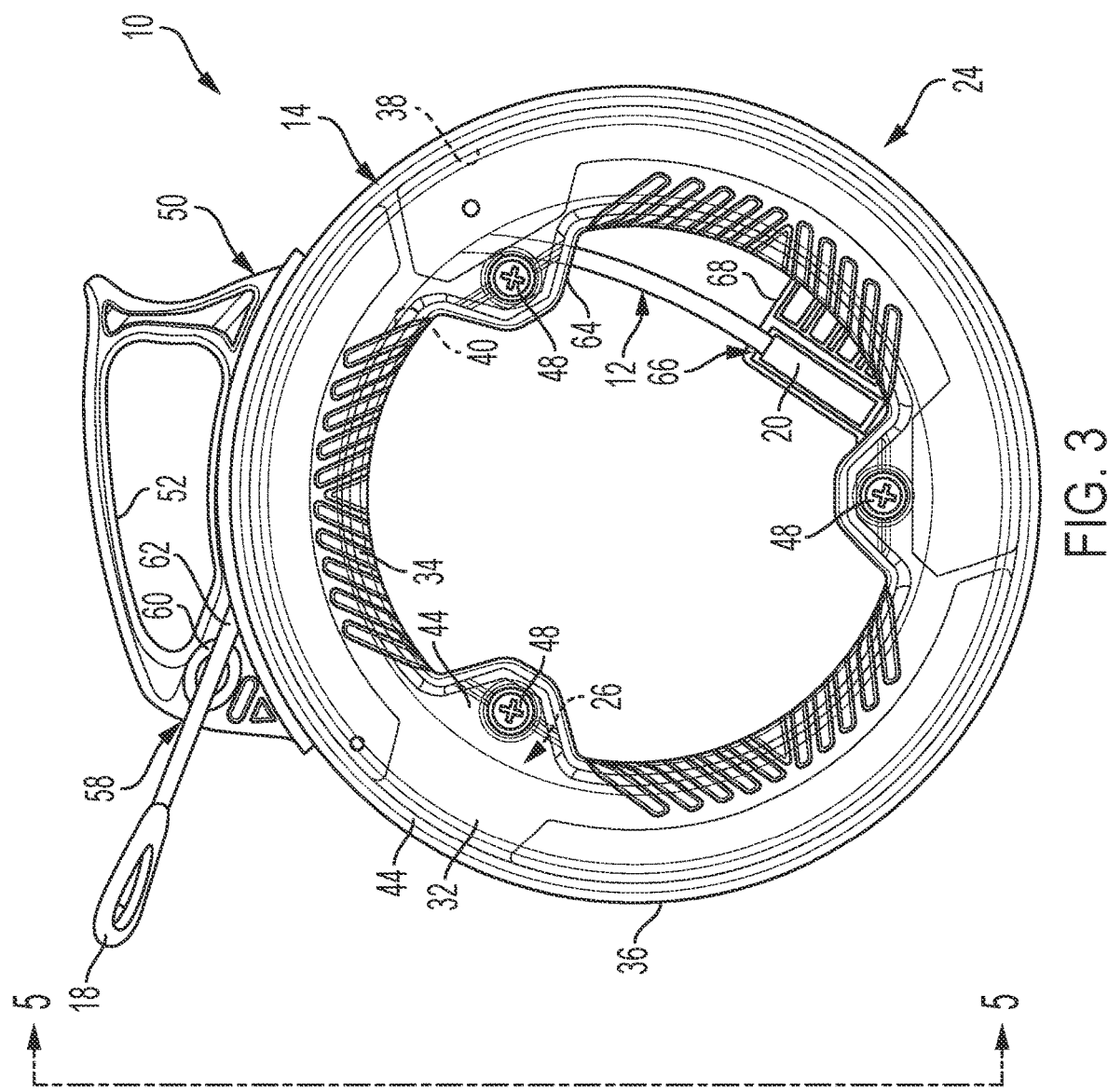

GLOW FISH TAPE SYSTEM

CROSS-REFERENCE TO RELATED APPLICATIONS

None

BACKGROUND OF THE DISCLOSURE

The present disclosure relates fish tapes that are deployed from a case that stores the fish tape when the fish tape is not in use. Most current fish tapes of this type utilize a case that deploys the fish tape from an annular slot, typically in an outer perimeter of the case, with at least a portion of the fish tape being retained in the case during use. Fish tapes are typically made of nylon, fiberglass, nylon jacketed fiberglass, or a suitable metal, such as stainless steel or tempered spring steel or multi-stranded steel wire, with the fish tape having sufficient stiffness to be pushed through a conduit or other enclosed space while being sufficiently flexible to flex around bends or corners in the conduit or other enclosed space. Fish tapes are provided in a variety of sizes and lengths, with the commercially available lengths typically being provided in the range of 20 feet to 240 feet.

Such fish tapes are used to pull electrical wires and fiber optic cables through conduit or into enclosed wall space and there are commercially available light emitting tips that can be connected to the end of the fish tape to improve the ability of a user to see the fish tape as it is moving near an opening through which a user wishes to pull electrical wire or fiber optic cable. While such fish tapes, cases and tips work well for their intended purpose, there is always room for improvement. For example, the light emitting tips are not as effective if the tip has already moved past the opening through which a user wants to pull the electrical wire or fiber optic cable.

BRIEF SUMMARY OF THE DISCLOSURE

In accordance with one feature of this disclosure, a fish tape system includes a fish tape and a donut shaped case. The fish tape has a length extending from a first end to a second end, and the length of the fish tape includes a luminescent material that emits light after being energized by exposure to a light source. The donut shaped case has a pair of sidewalls extending between a radially innermost wall and a radially outermost wall. The sidewalls are spaced from each other to define a fish tape storage compartment that stores the length of fish tape for deployment via the annular opening in the case. The case further includes an annular opening extending around a circumference of one of the inner and outer walls. At least a portion of the case is transparent to allow the luminescent material to be energized by light passing through the portion.

As one feature, the outermost wall has the annular opening extending around a circumference of the outer wall, and at least one of the sidewalls of the case is transparent to allow the luminescent material to be energized by light passing through the at least one of the sidewalls.

In one feature, both of the sidewalls of the case are transparent to allow the luminescent material to be energized by light passing through the sidewalls.

According to one feature, at least one of the innermost and outermost walls is transparent to allow the luminescent material to be energized by light passing through the sidewalls.

As one feature, one of the sidewalls and portions of the innermost and outermost walls are defined by a first component of the case, and the other of the sidewalls and other portions of the innermost and outermost walls are defined by a second component of the case. The first and second components are assembled together to form the storage compartment. In a further feature, at least one of the first and second components includes a transparent material. In yet a further feature, both of the first and second components includes a transparent material.

In one feature, the fish tape system further includes a handle engaged with the case for sliding movement along a circumference of one of the inner and outer walls, the handle engageable with the fish tape to deploy the fish tape from the storage compartment and to reload the fish tape into the compartment.

According to one feature, the fish tape system further includes a handle engaged with the case for sliding movement along a circumference of the outer wall. The handle is engageable with the fish tape to deploy the fish tape from the storage compartment and to reload the fish tape into the compartment.

As one feature, the fish tape further includes a threaded opening in at least one of the first and second ends.

In one feature, at least a portion of at least one of the sidewalls of the case is transparent to allow the luminescent material to be energized by light passing through the at least one of the sidewalls.

According to one feature, at least portions of both of the sidewalls of the case are transparent to allow the luminescent material to be energized by light passing through the sidewalls.

As one feature, at least portions of all the walls of the case are transparent.

In accordance with one feature, a fish tape system includes a fish tape and a case. The fish tape has a length extending from a first end to a second end, and the length of the fish tape includes a luminescent material that emits light after being energized by exposure to a light source. The case has a fish tape storage compartment that stores the length of fish tape for deployment and reloading via an opening in the case. At least a portion of the case is transparent to allow the luminescent material to be energized by light passing through the portion and into the storage compartment.

As one feature, the storage compartment has an annular shape bounded by a pair of spaced sidewalls. According to further feature, at least a portion of at least one of the sidewalls is transparent. In yet a further feature, portions of both of the sidewalls are transparent.

In one feature, the case includes a pair of components that are joined to each other to define the storage compartment, and at least one of the pair of components includes a transparent material.

It should be understood that the inventive concepts disclosed herein do not require each of the features discussed above, may include any combination of the features discussed, and may include features not specifically discussed above.

BRIEF SUMMARY OF THE SEVERAL VIEWS OF THE DRAWINGS

FIG. 3 is a left side elevation view of the fish tape system of FIG. 1;

DETAILED DESCRIPTION OF PREFERRED EMBODIMENTS

Figure 2:
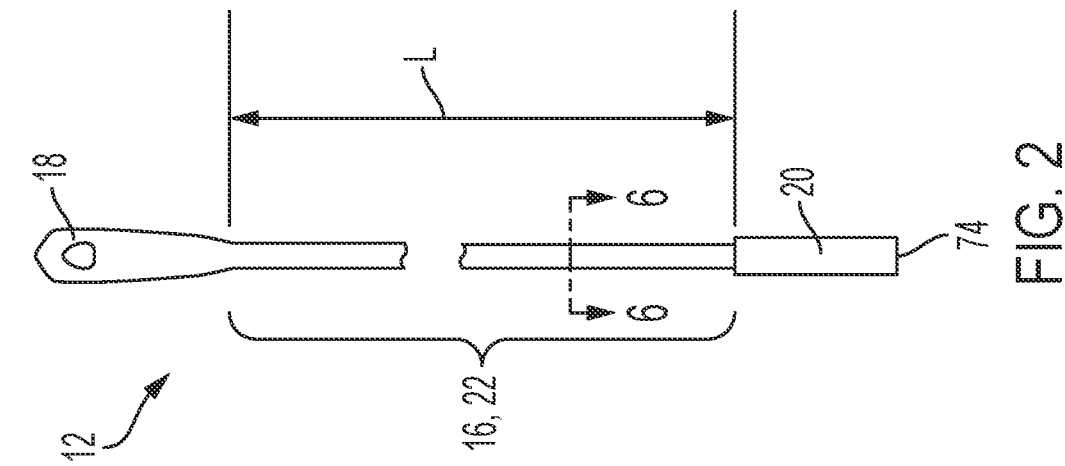
FIG. 2 is a plan view of a fish tape of the fish tape system shown in FIG. 1, with the fish tape removed from a case of the system and with a portion of the fish tape broken away for purposes of illustration.

As seen in FIGS. 1-5, a fish tape system 10 is provided and includes a fish tape 12 and a case 14. As best seen in FIG. 2, the fish tape 12 has a length 16 extending from a first end 18 to a second end 20. The length 16 includes a luminescent material 22 that emits light after being energized by exposure to a light source 24, such as the sun or a light emitting element. The case 14 has a fish tape storage compartment 26 that stores the fish tape 12 for deployment via an opening 28 in the case 14. At least a portion of the case 14 is transparent to allow the luminescent material 22 to be energized by light passing through the transparent portion and into the storage compartment 26.

Figure 1:
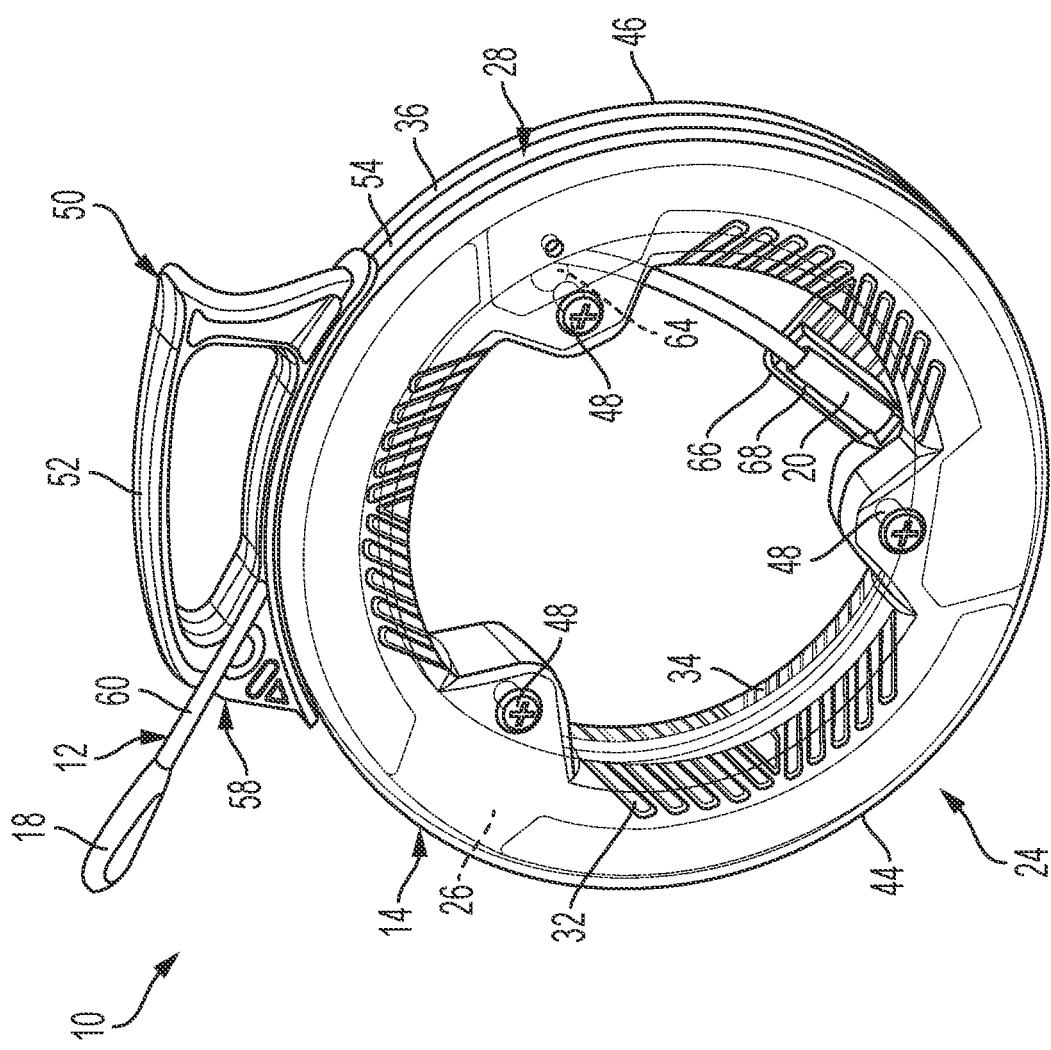
FIG. 1 is a view is a perspective view from above and to the left of a fish tape system according to this disclosure.
Figure 5:
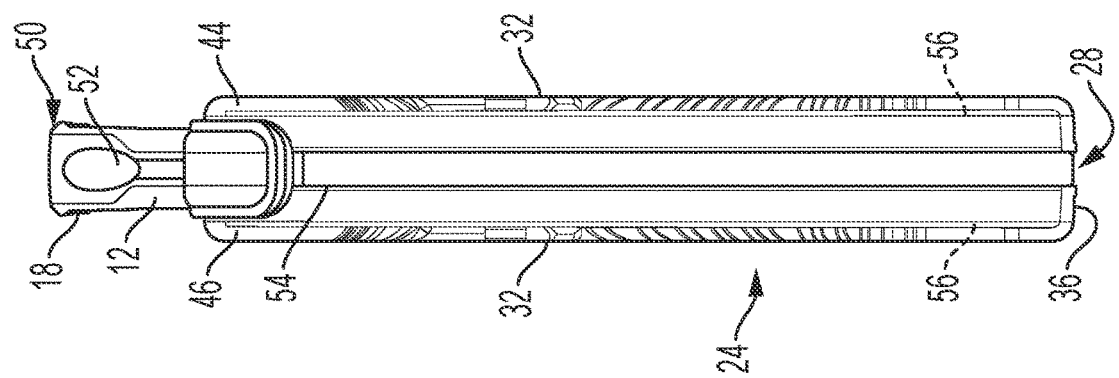
FIG. 5, is a view taken from line 5-5 in FIG. 3.
Figure 4:
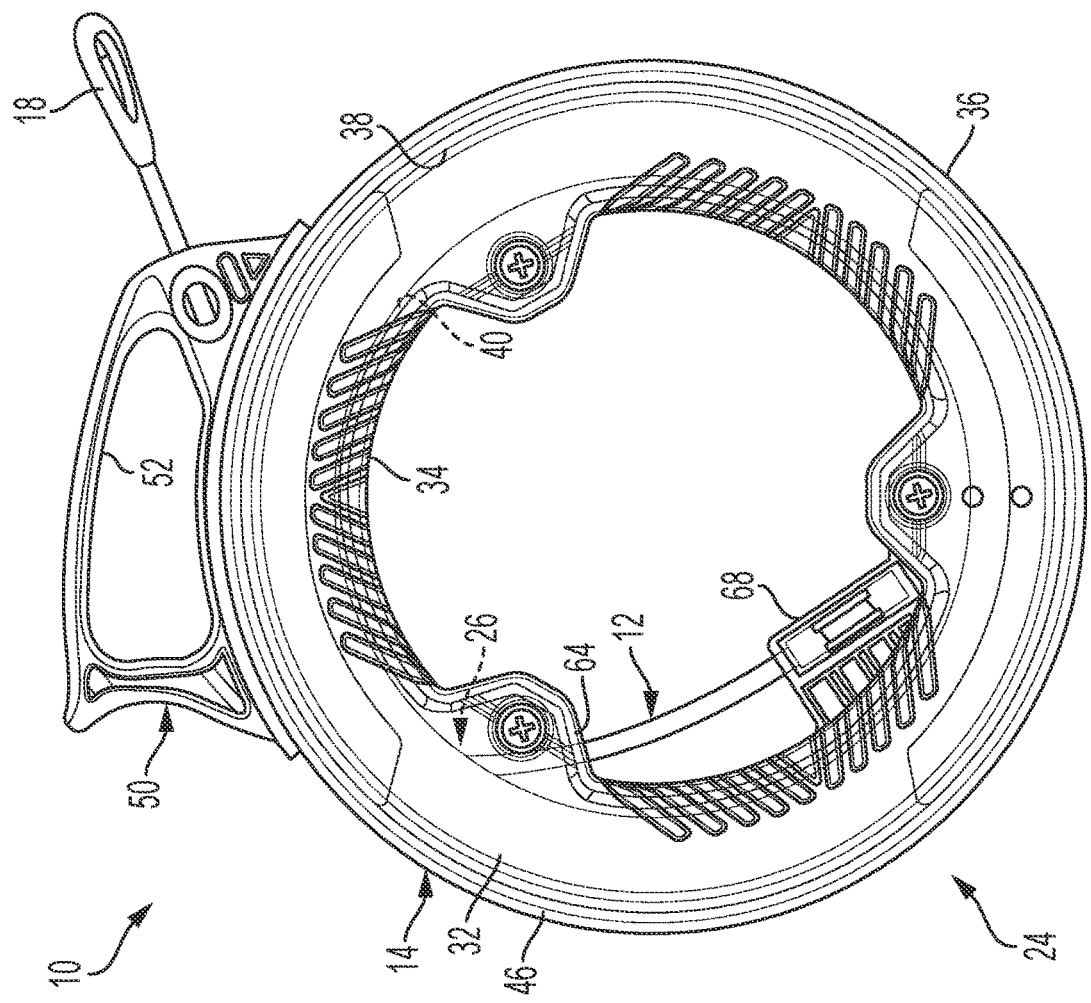
FIG. 4 is a right side elevation view of the fish tape system of FIGS. 1 and 3.

In the illustrated embodiment, the case 14 is donut shaped and includes a pair of sidewalls 32 (best seen in FIG. 5) extending between a radially innermost wall 34 and a radially outermost wall 36. The wall 36 includes the opening 28 in the form of an annular opening 28 extending around the entire circumference of the wall 36. The sidewalls 32 are spaced from each other, and in combination with inwardly facing annular surfaces 38 and 40 of the walls 34 and 36, respectively, define the storage compartment 26 with an annular shape. As best seen in FIGS. 1 and 5, the illustrated and preferred case 14 is an assembly of two, half-case components 44 and 46 that are joined to each other using threaded fasteners 48. Each of the components 44 and 46 define one of the sidewalls 32 and approximately one-half of each of the walls 34 and 36 and are preferably molded using a suitable process, such as injection molding. The annular opening 28 is defined between each portion of the wall 36 defined by each of the components 44 and 46. Such constructions for donut shaped fish tape cases are well known, with a few examples of such commercially cases being offered by Ideal Electronics under model numbers 31-542, 31-056, and 31-064; by Gardner Bender under model numbers FTS-125R, FTS-250R, and FTS-50B; and Klein Tools under model numbers 56001, 56014, 56002, and 56005.

In the illustrated and highly preferred embodiment, the walls 32, 34 and 36 are all transparent to allow the luminescent material 22 to be energized by light passing into the compartment 26 through the wall 32, 34, and 36. In this regard, the components 44 and 46 can be molded from any suitable material, such a suitable polymeric/plastic/composite material. Non-limiting examples of suitable materials include: polycarbonate, polypropylene, and Acrylonitrile butadiene styrene (ABS).

The illustrated and preferred embodiment of the system 10 also includes a winding handle 50 that is mounted to slide within the annular opening 28 around the entire circumference of the wall 36. The handle 50 includes a grip 52 and a hoop or ring 54. As best seen in FIG. 5, the ring 54 has oppositely facing annular ribs 56, with each rib received in a corresponding annular channel in a corresponding one of the half-case components 44 and 46 for guided, sliding movement around the entire circumference of the wall 36. As best seen in FIG. 3, the grip 52 includes a tape guide portion 58 having a linear slot 60 that receives and guides the fish tape 12 has it is deployed from and wound into the compartment 26 via an opening 62 that extends through the ring 54. The features 52, 54, 56, 58, 60 and 62 are well known and employed in commercially available fish tape systems.

It is highly preferred that system 10 be configured to allow the fish tape 12 to be easily removed from the case 14 for use and then rewound into the case 14 after use. In the illustrated and novel embodiment, this is achieved by sizing the slot 60 and opening 62 to allow the end 20 to be readily removed from the case 14 and reinserted into the case 14, by providing an opening 64 in the wall 34 that allows the end 20 to readily pass through the wall 34, and by providing the case 14 with an anchor slot 66 that provide a snap-fit with the end 20 to allow the end 20 to be releasably retained in the slot 66. In the illustrated embodiment, the slot 66 is defined in a boss 68 that is formed as an integral, unitary part of the half-case component 46.

Figure 6A:
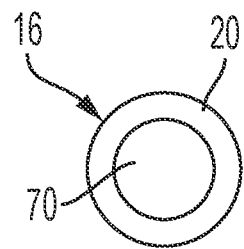
FIGS. 6A and 6B are enlarged views taken from line 6-6 in FIG. 2 and show alternate embodiments of the fish tape shown in FIG. 2.
Figure 6B:
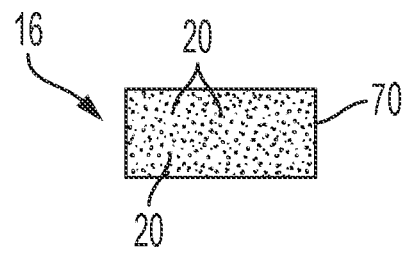
Figure 7:
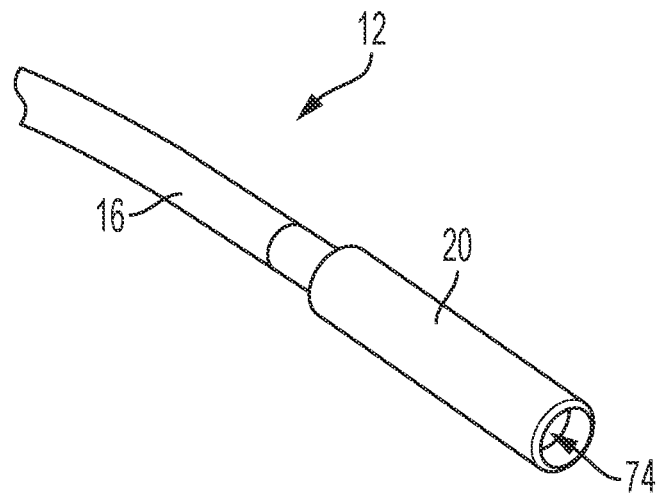
FIG. 7 is an enlarged perspective view showing an end configuration for a fish tape according to this disclosure.

The length 16 of the fish tape 12 is formed from a structural member 70 that extends over the entire length 16. The structural member 70 can be a flexible strip of metal, a multi-strand metallic wire, or a cord or rope of nylon, fiberglass, or other flexible, high tensile strength material. The luminescent material 22 can be provided in any suitable form and preferably extends over the entire length 16, such as, for example, in the form of a luminescent coating that includes the material 20, such as a paint, on the structural member 70 that extends over the entire length 16 (shown in FIG. 2); a luminescent sheath/jacket that includes the material 20 and surrounds the structural member 70 extending over the entire length 16 (shown in FIG. 6A); or in the form as an integral component of the material that forms the structural member 70 (shown in FIG. 6B). Non-limiting examples of suitable materials for the luminescent material 22 include: strontium aluminate, zinc sulfide, or either of those materials blended with a base material, such as nylon, polyethylene, and/or polyethylene terephthalate (PET).

Each end 18 and 20 of the fish tape 12 may be provided in any suitable form and/or configuration, many of which are known, to allow or assist a user in the attachment of an electrical wire or optic cable or in the grasping of the fish tape 12 during a pulling or pushing operation. Non-limiting examples of suitable forms/configurations for the ends 18 and 20 include eyelet ends (shown in FIGS. 1-4 for end 18), hook shaped ends, no-snag plastic tips, bullet ends, mini-eyelet ends, domed-eyelet ends, claw ends, male threaded connector ends, or female threaded connector ends, all of which are well known in commercially available fish tape systems and fish rod systems. FIGS. 1-4 and 7 shows an embodiment wherein the 20 has a threaded connector in the form of a female threaded opening 74.

Preferred embodiments of the inventive concepts are described herein, including the best mode known to the inventor(s) for carrying out the inventive concepts. Variations of those preferred embodiments will become apparent to those of ordinary skill in the art upon reading the foregoing description. The inventor(s) expect skilled artisans to employ such variations as appropriate, and the inventor(s) intend that the inventive concepts can be practiced otherwise than as specifically described herein.

Accordingly, the inventive concepts disclosed herein include all modifications and equivalents of the subject matter recited in the claims appended hereto as permitted by applicable law. Moreover, any combination of the above-described elements and features in all possible variations thereof is encompassed by the inventive concepts unless otherwise indicated herein or otherwise clearly contradicted by context. Further in this regard, while highly preferred forms of the fish tape system 10 are shown in the figures, it should be understood that this disclosure anticipates variations in the specific details of each of the disclosed components and features of the fish tape system 10 and that no limitation to a specific form, configuration, or detail is intended unless expressly and specifically recited in an appended claim.

For example, while specific and preferred forms have been shown for the case 14, in some applications other forms and configurations for the case 14 may be employed. For example, in some applications it may be desirable for just one of the side walls 32 to be transparent, with the other side wall 32 and the other walls 34 and 36 being opaque. As another example, it may be desirable for just a portion of one of the walls 32, 34, and/or 36 to be transparent. As yet another example, while it is preferred for the annular opening 28 to be provided in the radially outermost wall, in some applications it may be desirable for the annular opening 28 to be provide in the radially innermost wall 34. As another example, while an annular opening 28 is preferred, in some applications a different opening configuration/shape may be desired. In another example, while the two half-case components 44 and 46 preferred, in some embodiments it may be desirable to form the case 14 from a different configuration of components or a different number of components. Similarly, while the donut shape is a preferred form for the case 14, in some applications it may be desirable for the case 14 to have a different shape. As yet another example, while the disclosed configuration for the handle 50 is preferred, in some applications it may be desirable to utilize other configurations, many of which are known, for a winding handle. Similarly, in some applications it may be desirable for the system 10 to not have any type or configuration of winding handle. In a further example, while the opening 64, anchor slot 64 and boss 66 are preferred, in some application it may be desirable for these features to be eliminated and/or for replaced with other features to attach or anchor the end 20 in the case 14. In another example, while circular and rectangular cross sections have been shown for the fish tape 12, other cross sections may be desirable depending upon the specific application and/or material(s) used for the fish tape 12.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. The use of any and all examples, or exemplary language (e.g., "such as") provided herein, is intended merely to better illuminate the inventive concepts disclosed herein and does not pose a limitation on the scope of any invention unless expressly claimed. No language in the specification should be construed as indicating any non-claimed element as essential to the practice of the inventive concepts disclosed herein.

All references, including publications, patent applications, and patents, cited herein are hereby incorporated by reference to the same extent as if each reference were individually and specifically indicated to be incorporated by reference and were set forth in its entirety herein.

What is claimed is:

1. A fish tape system comprising:
a fish tape having a length extending from a first end to a second end, the length of the fish tape comprising a luminescent material that emits light after being energized by exposure to a light source;
a donut shaped case having a pair of sidewalls extending between a radially innermost wall and a radially outermost wall, the outermost wall having an annular opening extending around a circumference of the outer wall, the sidewalls being spaced from each other to define a fish tape storage compartment that stores the length of fish tape for deployment via the annular opening in the case; and
a handle engaged with the fish tape and mounted to slide within the annular opening of the case around the entire circumference of the outer wall to deploy the fish tape from the storage compartment and to reload the fish tape into the compartment;
wherein at least one of the sidewalls of the case is transparent to allow the luminescent material to be energized by light passing through the at least one of the sidewalls.

2. The fish tape system of claim 1 wherein both of the sidewalls of the case are transparent to allow the luminescent material to be energized by light passing through the sidewalls.

3. The fish tape system of claim 2 wherein at least one of the innermost and outermost walls is transparent to allow the luminescent material to be energized by light passing through the sidewalls.

4. The fish tape system of claim 1 wherein one of the sidewalls and portions of the innermost and outermost walls are defined by a first component of the case, and the other of the sidewalls and other portions of the innermost and outermost walls are defined by a second component of the case, the first and second components being assembled together to form the storage compartment.

5. The fish tape system of claim 1 wherein the fish tape further comprises a threaded opening in at least one of the first and second ends.

6. A fish tape system comprising:
a fish tape having a length extending from a first end to a second end, the length of the fish tape comprising a luminescent material that emits light after being energized by exposure to a light source;
a donut shaped case having a pair of sidewalls extending between a radially innermost wall and a radially outermost wall, an annular opening extending around a circumference of one of the inner and outer walls, the sidewalls being spaced from each other to define a fish tape storage compartment that stores the length of fish tape for deployment via the annular opening in the case; and
a handle engaged with the fish tape and mounted to slide within the annular opening of the case around the entire circumference to deploy the fish tape from the storage compartment and to reload the fish tape into the compartment;

wherein at least a portion of the case is transparent to allow the luminescent material to be energized by light passing through the portion.

7. The fish tape system of claim 6 wherein the fish tape further comprises a threaded opening in at least one of the first and second ends.

8. The fish tape system of claim 6 wherein at least a portion of at least one of the sidewalls of the case is transparent to allow the luminescent material to be energized by light passing through the at least one of the sidewalls.

9. The fish tape system of claim 6 wherein at least portions of both of the sidewalls of the case are transparent to allow the luminescent material to be energized by light passing through the sidewalls.

10. The fish tape system of claim 6 wherein at least portions of all the walls of the case are transparent.

11. The fish tape system of claim 6 wherein one of the sidewalls and portions of the innermost and outermost walls are defined by a first component of the case, and the other of the sidewalls and other portions of the innermost and outermost walls are defined by a second component of the case, the first and second components being assembled together to form the storage compartment.

12. The fish tape system of claim 11 wherein at least one of the first and second components comprises a transparent material.

13. The fish tape system of claim 11 wherein both of the first and second components comprises a transparent material.

14. A fish tape system comprising:

a fish tape having a length extending from a first end to a second end, the length of the fish tape comprising a luminescent material that emits light after being energized by exposure to a light source;

a case having a fish tape storage compartment that stores the length of fish tape for deployment and reloading via an annular opening in the case; and a handle engaged with the fish tape and mounted to slide within the annular opening of the case around an entire circumference of the annular opening to deploy the fish tape from the storage compartment and to reload the fish tape into the compartment;

wherein at least a portion of the case is transparent to allow the luminescent material to be energized by light passing through the portion and into the storage compartment.

15. The fish tape system of claim 14 wherein the storage compartment has an annular shape bounded by a pair of spaced sidewalls.

16. The fish tape system of claim 15 wherein at least a portion of at least one of the sidewalls is transparent.

17. The fish tape system of claim 16 wherein portions of both of the sidewalls are transparent.

18. The fish tape system of claim 14 wherein the case comprises a pair of components that are joined to each other to define the storage compartment, and at least one of the pair of components comprises a transparent material.

* * * * *